United States Patent
Lu et al.

(10) Patent No.: US 11,975,466 B2
(45) Date of Patent: May 7, 2024

(54) INJECTION MOLDED CAPS OR CLOSURES, AND METHODS THEREOF

(71) Applicant: Dow Global Technologies LLC, Midland, MI (US)

(72) Inventors: Keran Lu, Pearland, TX (US); Yijian Lin, Pearland, TX (US); Mridula Kapur, Lake Jackson, TX (US); Tian Lan, Langhorne, PA (US); Stephanie M. Whited, South Charleston, WV (US); John L. Sugden, Saginaw, MI (US); Siddharth Ram Athreya, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 107 days.

(21) Appl. No.: 17/603,456

(22) PCT Filed: May 29, 2020

(86) PCT No.: PCT/US2020/035329
§ 371 (c)(1),
(2) Date: Oct. 13, 2021

(87) PCT Pub. No.: WO2020/251785
PCT Pub. Date: Dec. 17, 2020

(65) Prior Publication Data
US 2022/0176599 A1    Jun. 9, 2022

Related U.S. Application Data

(60) Provisional application No. 62/859,892, filed on Jun. 11, 2019.

(51) Int. Cl.
*B29C 64/00* (2017.01)
*B29C 45/00* (2006.01)
(Continued)

(52) U.S. Cl.
CPC ...... *B29C 45/0001* (2013.01); *B29D 99/0096* (2013.01); *B29K 2023/065* (2013.01);
(Continued)

(58) Field of Classification Search
CPC ................................. C08L 23/06; B01J 19/06
See application file for complete search history.

(56) References Cited

U.S. PATENT DOCUMENTS 7,592,397 B2    9/2009    Markovich et al.
7,750,082 B2    7/2010    De Cambry De Baudimont et al.
(Continued)

FOREIGN PATENT DOCUMENTS

CA    2314994 A1    6/1999
CA    2629576 A1    10/2009
(Continued)

OTHER PUBLICATIONS

PCT/US2020/035329, International Search Report and Written Opinion dated Aug. 25, 2020.
(Continued)

*Primary Examiner* — Nicholas R Krasnow
(74) *Attorney, Agent, or Firm* — Jacob Graham

(57) ABSTRACT

An injection molded cap or closure having a weld line, wherein the injection molded cap or closure is formed from an ethylene-based resin comprising a high molecular weight component and a low molecular weight component.

12 Claims, 3 Drawing Sheets

(51) Int. Cl.
   *B29D 99/00* (2010.01)
   *B29K 23/00* (2006.01)
(52) U.S. Cl.
   CPC .. *B29K 2023/08* (2013.01); *B29K 2995/0063* (2013.01); *B29K 2995/0086* (2013.01); *B29K 2995/0088* (2013.01)

(56) References Cited

U.S. PATENT DOCUMENTS

| | | | |
|---|---|---|---|
| 7,947,793 B2 | 5/2011 | Marchand et al. | |
| 8,044,160 B2 | 10/2011 | Nord-Varhaug et al. | |
| 8,759,448 B2 | 6/2014 | Buryak et al. | |
| 8,816,006 B2 | 8/2014 | Fuchs et al. | |
| 8,962,755 B2 | 2/2015 | Wang et al. | |
| 9,074,082 B2 | 7/2015 | Wang et al. | |
| 9,221,966 B2 | 12/2015 | Wang et al. | |
| 9,371,442 B2 | 6/2016 | Wang | |
| 9,475,927 B2 | 10/2016 | Wang et al. | |
| 9,637,628 B2 | 5/2017 | Wang | |
| 9,758,653 B2 | 9/2017 | Wang et al. | |
| 9,783,663 B2 | 10/2017 | Wang | |
| 9,976,017 B2 | 5/2018 | Koch et al. | |
| 10,071,826 B2 | 9/2018 | Wang | |
| 10,071,895 B2 | 9/2018 | Wang et al. | |
| 10,377,887 B2 | 8/2019 | Wang | |
| 2005/0267249 A1 | 12/2005 | Wilson et al. | |
| 2011/0034635 A1* | 2/2011 | Kapur | C08L 23/04 525/240 |
| 2015/0094418 A1* | 4/2015 | Wang | C08F 10/02 525/240 |
| 2017/0158789 A1 | 6/2017 | Bellehumeur et al. | |
| 2017/0166333 A1 | 6/2017 | Wang | |
| 2022/0056248 A1* | 2/2022 | Wang | B01J 19/06 |

FOREIGN PATENT DOCUMENTS

| | | |
|---|---|---|
| EP | 2751193 A1 | 7/2014 |
| GB | 965838 A | 8/1964 |

OTHER PUBLICATIONS

PCT/US2020/035329, International Preliminary Report on Patentability dated Dec. 14, 2021.

* cited by examiner

INJECTION MOLDED CAPS OR CLOSURES, AND METHODS THEREOF

TECHNICAL FIELD

Embodiments of the present disclosure generally relate to injection molded caps or closures, and more particularly to injection molded caps or closures having a weld line.

BACKGROUND

Tamper evident or tamper indicating closure assemblies can incorporate a cap portion and a tamper evident band portion. The tamper evident band is connected to the cap through a plurality of frangible bridges, or weakened tabs, that break when attempts are made to remove the cap portion. Upon removal of the cap the tamper evident band becomes separated from the cap and remains on a container's neck. The broken bridges and separated tamper evident band may provide the user with evidence that the container has already been opened and/or that the container contents may have been tampered with or altered.

Weld lines may be formed during injection molding where polymer melt fronts meet inside the mold. The weld line can be a point of weakness during stressing of the molded article. For example, when the tamper-evident band of a closure is formed in-mold, resin must flow through the bridges connecting the tamper-evident band to the rest of the closure. Between every two consecutive bridges is a weld line that is formed in the tamper-evident band. This can be a problem for closures molded from higher viscosity multimodal polymer melts that have higher toughness, crack-resistance, and other desired physical bulk properties through incorporation of a high molecular weight component. This high molecular weight component, when not formulated properly, result in resins that form weld lines prone to failure, with weaker average properties than those of the formulation in the bulk (i.e. not at weld line). One consequence of weak weld lines is premature splitting of a tamper-evident band when the closure is first applied to a bottle neck finish, resulting in loss of the tamper-evidence functionality.

Accordingly, it may be desirable to produce polyethylene compositions for use in manufacturing injection molded caps or closures having a strong weld line.

SUMMARY

Disclosed in embodiments herein are injection molded caps or closures. The injection molded caps or closures are formed from an ethylene-based resin, the ethylene-based resin comprising a high molecular weight component, wherein the high molecular weight component comprises an ethylene/alpha-olefin copolymer having a density of from 0.915 g/cc to 0.940 g/cc and a high load melt index (I21.6) of from 3.0 g/10 min to 12.0 g/10 min; and a low molecular weight component; wherein the ethylene-based resin comprises 50 wt. % to 60 wt. % of the high molecular weight component; and wherein the ethylene-based resin has: a density of from 0.945 g/cc to 0.958 g/cc; a melt index (I2.16) of from 1.0 g/10 min to 3.0 g/10 min; an molecular weight distribution (Mw/Mn) of from 5.0 to 8.0, where Mw is the weight average molecular weight and Mn is the number average molecular weight; and a cross-over relaxation time of less than 80 ms.

Also disclosed in embodiments herein are methods of manufacturing injection molded caps or closures having a weld line, the methods comprising providing an ethylene-based resin comprising a high molecular weight component, wherein the high molecular weight component comprises an ethylene/alpha-olefin copolymer having a density of from 0.915 g/cc to 0.940 g/cc and a high load melt index (I21.6) of from 3.0 g/10 min to 12.0 g/10 min; and a low molecular weight component; wherein the ethylene-based resin comprises 50 wt. % to 60 wt. % of the high molecular weight component; and wherein the ethylene-based resin has: a density of from 0.945 g/cc to 0.958 g/cc; a melt index (I2.16) of from 1.0 g/10 min to 3.0 g/10 min; an molecular weight distribution (Mw/Mn) of from 5.0 to 8.0, where Mw is the weight average molecular weight and Mn is the number average molecular weight; and a cross-over relaxation time of less than 80 ms; and injection molding the ethylene-based resin to form a injection molded cap or closure having a weld line.

Additional features and advantages of the embodiments will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing and the following description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
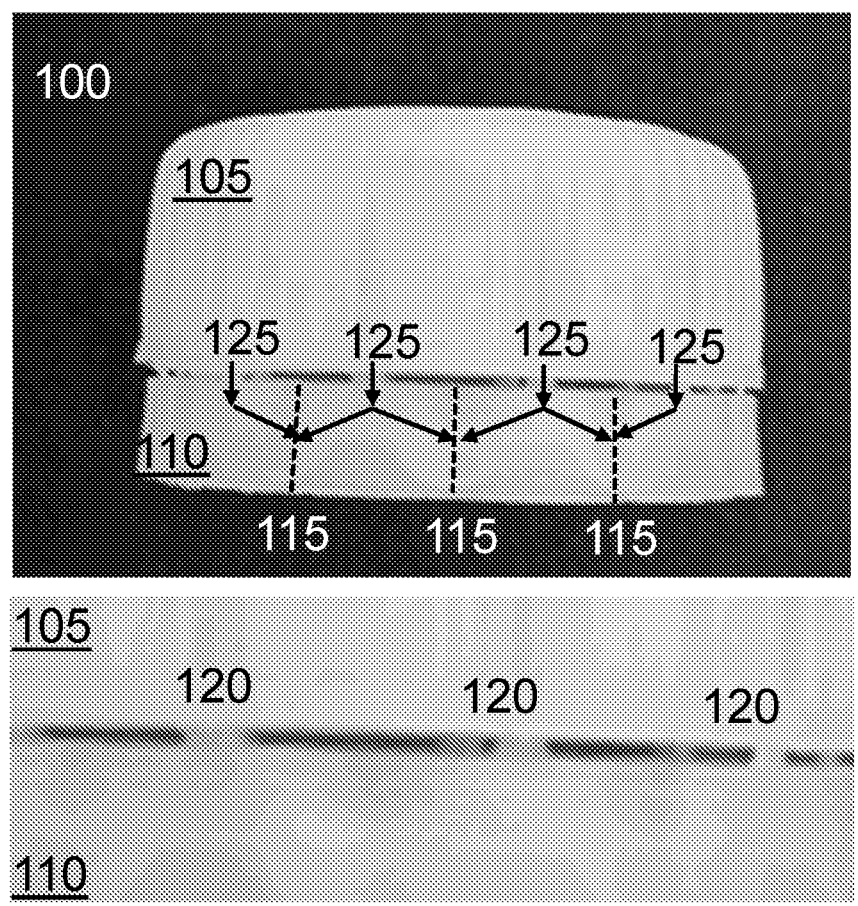
FIG. 1 pictorially depicts an injection molded cap or closure having a weld line and bridges that connects a cap portion and a tamper evident band portion. The weld line is on the tamper evident band portion and is in the center between two bridges.

Reference will now be made in detail to embodiments of injection molded caps or closures having a weld line. The injection molded caps or closures are formed from an ethylene-based resin. The ethylene-based resin is further described herein. The embodiments described herein are also applicable to other technologies that are susceptible to similar tamper evident problems, such as, for example, tamper evident lids.

The injection molded caps or closures described herein are formed from at least 50 wt. % of the ethylene-based resin. All individual values and subranges are included and disclosed herein. For example, in some embodiments, the injection molded caps or closures described herein are formed from at least 60 wt. %, at least 70 wt. %, at least 80 wt. %, at least 90 wt. %, at least 95 wt. % of the ethylene-based resin. In other embodiments, the injection molded caps or closures described herein are formed from 50 wt. % to 100 wt. %, 65 wt. % to 100 wt. %, 75 wt. % to 100 wt.

%, 85 wt. % to 100 wt. %, 92 wt. % to 100 wt. %, or 95 wt. % to 100 wt. % of the ethylene-based resin.

Ethylene-Based Resin

As used herein, "ethylene-based" refers to resins that comprise a majority weight percent of ethylene (based on the weight of resin), and, optionally, one or more additional components. In embodiments herein, the ethylene-based resin comprises a high molecular weight component and a low molecular weight component. The high molecular weight component has a higher molecular weight than the low molecular weight component. In embodiments herein, the ethylene-based resin comprises 50 wt. % to 60 wt. % of the high molecular weight component. All individual values and subranges are included and disclosed herein. For example, in some embodiments, the ethylene-based resin comprises from 50 wt. %, greater than 50 wt. %, or 50.5 wt. % to 60 wt. %, 58 wt. %, or 57 wt. % of the high molecular weight component. In other embodiments, the ethylene-based resin comprises from 50 wt. % to 58 wt. %, from 50 wt. % to 57 wt. %, from greater than 50 wt. % to 60 wt. %, from greater than 50 wt. % to 58 wt. %, from greater than 50 wt. % to 57 wt. %, from 50.5 wt. % to 60 wt. %, from 50.5 wt. % to 58 wt. %, or from 50.5 wt. % to 57 wt. % of the high molecular weight component. In further embodiments, the ethylene-based resin comprises from 50 wt. % to 57 wt. %, from greater than 50 wt. % to 60 wt. %, from greater than 50 wt. % to 57 wt. %, from 50.5 wt. % to 60 wt. %, or from 50.5 wt. % to 57 wt. % of the high molecular weight component.

In embodiments herein, the high molecular weight component comprises an ethylene/alpha-olefin copolymer or ethylene homopolymer. In some embodiments, the high molecular weight component comprises an ethylene/alpha-olefin copolymer. In other embodiments, the high molecular weight component comprises ethylene homopolymer. As used herein, "ethylene/alpha-olefin copolymer" refers to a polymer comprising repeating units derived from ethylene and at least one alpha-olefin comonomer. The alpha-olefin comonomer may have no more than 20 carbon atoms. For example, the alpha-olefin comonomers may have 3 to 10 carbon atoms or 3 to 8 carbon atoms. Exemplary alpha-olefin comonomers may include, but are not limited to, propylene, 1-butene, 1-pentene, 1-hexene, 1-heptene, 1-octene, 1-nonene, 1-decene, and 4-methyl-1-pentene. In some embodiments, the alpha-olefin comonomers are selected from the group consisting of propylene, 1-butene, 1-hexene, and 1-octene. In other embodiments, the alpha-olefin comonomers are selected from the group consisting of 1-hexene and 1-octene. "Ethylene homopolymer" refers to a polymer that consists essentially of repeating units derived from ethylene. In some examples, an ethylene homopolymer contains at least 99 percent by weight of ethylene units, at least 99.5% by weight of ethylene units, at least 99.8% by weight of ethylene units, or at least 99.9% by weight of ethylene units.

In embodiments herein, the density of the high molecular weight component is from 0.915 g/cc-0.940 g/cc. All individual values and subranges of 0.915 to 0.940 g/cc are included and disclosed herein. For example, in some embodiments, the density of the high molecular weight component is from 0.920 g/cc to 0.940 g/cc, from 0.920 g/cc to less than 0.940 g/cc, from 0.920 g/cc to 0.939 g/cc, from 0.925 g/cc to 0.940 g/cc, from 0.925 g/cc to less than 0.940 g/cc, or from 0.925 g/cc to 0.939 g/cc. Densities disclosed herein for ethylene-based polymers are determined according to ASTM D-792.

In addition to the density of the high molecular weight component, the high load melt index ($I_{21.6}$) of the high molecular weight component is from 3.0 g/10 min to 12.0 g/10 min. All individual values and subranges of 3.0 g/10 min to 12.0 g/10 min are included and disclosed herein. For example, in some embodiments, the high load melt index ($I_{21.6}$) of the high molecular weight component is from 3.5 g/10 min to 12.0 g/10 min. In other embodiments, the high load melt index ($I_{21.6}$) of the high molecular weight component is from 4.0 g/10 min to 11.0 g/10 min. High load melt index, or $I_{21.6}$, for ethylene-based polymers is determined according to ASTM D1238 at 190° C., 21.6 kg.

In addition to the density and high load melt index of the high molecular weight component, the molecular weight distribution ($M_w/M_n$) of the high molecular weight component may be from 3.5 to 5.5. All individual values and subranges of from 3.5 to 5.5 are included and disclosed herein. For example, in some embodiments, the molecular weight distribution ($M_w/M_n$) of the high molecular weight component may be from 3.5 to 5.5. In other embodiments, the molecular weight distribution ($M_w/M_n$) of the high molecular weight component may be from 3.5 to 5.5. As used herein, $M_w$ is the weight average molecular weight and $M_n$ is the number average molecular weight. Where the high molecular weight is made in the first reactor, the $M_w$ and $M_n$ of the high molecular weight component may be measured directly using gel permeation chromatography (GPC) by taking a sample of the material from the first reactor. The $M_w$ and $M_n$ of the high molecular weight component may also be estimated by manufacturing the high molecular weight component separately from the low molecular weight component and measuring the $M_w$ and $M_n$ using GPC.

In embodiments herein, the low molecular weight component may be an ethylene homopolymer or an ethylene/alpha-olefin copolymer. In some embodiments, the low molecular weight component comprises an ethylene/alpha-olefin copolymer. The alpha-olefin is previously described herein. In some embodiments, the high molecular weight component is an ethylene-alpha-olefin copolymer and the low molecular weight component is an ethylene/alpha-olefin copolymer.

In embodiments herein, the calculated density of the low molecular weight component may be at least 0.950 g/cc. All individual values and subranges of at least 0.950 g/cc are included and disclosed herein. For example, in some embodiments, the calculated density of the low molecular weight component may range from 0.950 to 0.975 g/cc. In other embodiments, the calculated density of the low molecular weight component may be at least 0.955 g/cc or range from 0.955 to 0.972 g/cc. In further embodiments, the density of the low molecular weight component may be at least 0.958 g/cc or range from 0.958 to 0.972 g/cc. The density of the low molecular weight component may be calculated from the following equation (I):

$$\frac{1}{\text{Density } (PE)} = \frac{\text{Weight Fraction } (A)}{\text{Density } (A)} + \frac{\text{Weight Fraction } (B)}{\text{Density } (B)} \quad (I)$$

wherein "A" is the high molecular weight component, "B" is the low molecular weight component, and "PE" is the ethylene-based resin. In some embodiments, the low molecular weight component has a calculated density that is at least 0.005 g/cc higher than the high molecular weight component.

In embodiments herein, the ethylene-based resin has a density ranging from 0.945 to 0.958 g/cc. All individual values and subranges of from 0.945 to 0.958 g/cc are included and disclosed herein. For example, in some embodiments, the ethylene-based resin has a density ranging from 0.947 to 0.958 g/cc, 0.947 to 0.956 g/cc, or 0.949 to 0.956 g/cc.

In addition to the density, the ethylene-based resin has a melt index ($I_{2.16}$) ranging from 1.0 g/10 min to 3.0 g/10 min. All individual values and subranges of from 1.0 g/10 min to 3.0 g/10 min are included and disclosed herein. For example, in some embodiments, the ethylene-based resin has a melt index ($I_{2.16}$) ranging from 1.2 g/10 min to 3.0 g/10 min or 1.2 g/10 min to 2.7 g/10 min.

In addition to the density and $I_{2.16}$, the ethylene-based resin has a molecular weight distribution ($M_w/M_n$) of from 5.0 to 8.0. All individual values and subranges of from 5.0 to 8.0 are included and disclosed herein. For example, in some embodiments, the ethylene-based resin has a molecular weight distribution ($M_w/M_n$) of from 5.0 to 7.5 or 5.5 to 7.5. In other embodiments, the ethylene-based resin has a molecular weight distribution ($M_w/M_n$) of from 6.0 to 7.5. As used herein, $M_w$ refers to the ratio of weight average molecular weight and $M_n$ refers to the number average molecular weight ($M_n$). The weight average molecular weight ($M_w$) and the number average molecular weight ($M_n$) may be determined by gel permeation chromatography (GPC).

In addition to the density, $I_{2.16}$, and $M_w/M_n$, the ethylene-based resin has a molecular weight distribution ($M_z/M_w$) of from 4.10 to 5.15. All individual values and subranges of from 4.10 to 5.15 are included and disclosed herein. For example, in some embodiments, the ethylene-based resin has a molecular weight distribution ($M_z/M_w$) of from 4.15 to 5.15, 4.20 to 5.15, 4.50 to 5.15, and 4.60 to 5.15. In other embodiments, the ethylene-based resin has a molecular weight distribution ($M_w/M_n$) of from 4.10 to 5.12, 4.10 to 5.10, 4.20 to 5.10, 4.50 to 5.10, and 4.60 to 5.10. As used herein, $M_z$ refers to the ratio of z-average molecular weight and $M_w$ refers to the weight average molecular weight ($M_w$). The weight average molecular weight ($M_w$) and the z-average molecular weight ($M_z$) may be determined by gel permeation chromatography (GPC).

In addition to the density, $I_{2.16}$, $M_w/M_n$ and $M_z/M_w$, the ethylene-based resin has a cross-over relaxation time of less than 80 ms. All individual values and subranges of less than 80 ms are included and disclosed herein. For example, in some embodiments, the ethylene-based resin may have a cross-over relaxation time of less than 75 ms, less than 70 ms, or from 20 ms to 80 ms, from 25 ms to 80 ms, from 25 ms to 75 ms, or from 25 ms to 70 ms. Cross-over relaxation time can be reduced by lowering the I21.6/I2.16 of the formulation.

In addition to the density, $I_{2.16}$, $M_w/M_n$, $M_z/M_w$, and cross-over relaxation time, the ethylene-based resin may have a high load melt index ($I_{21.6}$) of 50 g/10 min to 110 g/10 min. All individual values and subranges of 50 g/10 min to 110 g/10 min are included and disclosed herein. For example, in some embodiments, the ethylene-based resin may have a high load melt index ($I_{21.6}$) from 55 g/10 min to 110 g/10 min.

In addition to the density, $I_{21.6}$, $M_w/M_n$, $M_z/M_w$, cross-over relaxation time, and high load melt index, the ethylene-based resin may have a z-average molecular weight ($M_z$) of greater than or equal to 450,000 g/mole. All individual values and subranges of greater than or equal to 450,000 g/mole are included and disclosed herein. For example, in some embodiments, the ethylene-based resin may have a z-average molecular weight of 450,000 g/mole to 850,000 g/mole, 475,000 g/mole to 800,000 g/mole, or 500,000 g/mole to 750,000 g/mole. The z-average molecular weight may be determined by gel permeation chromatography (GPC).

In addition to the density, $I_{21.6}$, $M_w/M_n$, $M_z/M_w$, cross-over relaxation time, high load melt index, and z-average molecular weight ($M_z$), the ethylene-based resin may have a zero shear viscosity ratio (ZSVR) of less than or equal to 1.25. All individual values and subranges of less than or equal to 1.25 are included and disclosed herein. For example, in some embodiments, the ethylene-based resin may have a zero shear viscosity ratio (ZSVR) of less than or equal to 1.22, less than 1.20, from 1.0 to 1.25, from 1.0 to 1.22, or from 1.0 to 1.20.

In addition to the density, $I_{21.6}$, $M_w/M_n$, $M_z/M_w$, cross-over relaxation time, high load melt index, $M_z$, and ZSVR, the ethylene-based resin may exhibit an environmental stress crack resistance (ESCR) (F50) according to ASTM D-1693, condition B at 50° C. using 10% Tergitol NP-9 or equivalent (such as, IGEPAL CO-630), in the range of 30 to 200 hours. All individual values and subranges of 30 to 200 hours are included and disclosed herein. For example, in some embodiments, the ethylene-based resin may exhibit an environmental stress crack resistance (ESCR) (F50) according to ASTM D-1693, condition B at 50° C. using 10% Tergitol NP-9 or equivalent, in the range of 30 to 175 hours. In other embodiments, the ethylene-based resin may exhibit an environmental stress crack resistance (ESCR) (F50) according to ASTM D-1693, condition B at 50° C. using 10% Tergitol NP-9 or equivalent, in the range of 30 to 150 hours.

The ethylene-based resins described herein may contain one or more additives. Suitable additives may include, but are not limited to, processing aids, acid neutralizers, UV stabilizers, hydro peroxide decomposers, alkyl radical scavengers, hindered amine stabilizers, multifunctional stabilizers, phosphites, antioxidants, process stabilizers, metal de-activators, additives to improve oxidative or chlorine resistance, pigments or colorants, nucleating agents, fatty acid stearates, fluoroelastomers, fillers, and combinations thereof.

In embodiments herein, the ethylene-based resin can be made by a variety of methods. For example, such methods may include, but are not limited to, gas phase polymerization process, slurry phase polymerization process, liquid phase polymerization process, and combinations thereof using one or more conventional reactors, e.g. fluidized bed gas phase reactors, loop reactors, stirred tank reactors, batch reactors in parallel, series, and/or any combinations thereof. In the alternative, the ethylene-based resin may be produced in a high pressure reactor via a coordination catalyst system. For example, the ethylene-based resin may be produced via gas phase polymerization process in a gas phase reactor; however, the instant invention is not so limited, and any of the above polymerization processes may be employed. In some embodiments, the polymerization reactor may comprise of two or more reactors in series, parallel, or combinations thereof, and wherein each polymerization takes place in solution, in slurry, or in the gas phase. In some embodiments, a dual reactor configuration is used where the polymer made in the first reactor can be either the high molecular weight component or the low molecular weight component. The polymer made in the second reactor may have a density and melt flow rate such that the overall density and melt flow rate of the polyethylene resin are met.

Similar polymerization processes are described in, for example, WO 2004/101674A, which is incorporated herein by reference.

In embodiments herein, a method of manufacturing an ethylene-based resin may comprise polymerizing a high molecular weight component, as previously described herein, in a reactor, and polymerizing a low molecular weight component, as previously described herein, in a different reactor, thereby producing an ethylene-based resin. The two reactors may be operated in series. In some embodiments, the high molecular weight component is polymerized in a first reactor, and the low molecular weight component is polymerized in a second reactor. In other embodiments, the low molecular weight component is polymerized in a first reactor, and the high molecular weight component is polymerized in a second reactor.

The weight ratio of copolymer prepared in the high molecular weight reactor to copolymer prepared in the low molecular weight reactor can be in the range of about 50:50 to about 60:40. This is also known as the polymer split.

In some embodiments, the ethylene-based resin is manufactured using at least one Ziegler-Natta (Z-N) catalyst system. In other embodiments, the ethylene-based resin is manufactured using multiple reactors in series with a Z-N catalyst being fed to either each reactor or to just the first reactor. In further embodiments, the Z-N catalyst system may be fed into one or two independently-controlled reactors configured sequentially, and operated in solution, slurry or gas phase. In even further embodiments, the Z-N catalyst system may be fed into one or two independently-controlled reactors configured sequentially, and operated in gas phase. Sequential polymerization may be conducted such that fresh catalyst is injected into one reactor, and active catalyst is carried over from the first reactor into the second reactor. The resulting ethylene-based resin may be characterized as comprising component polymers, each having distinct, unimodal molecular weight distributions. As used herein, "distinct," when used in reference to the molecular weight distribution of the high molecular weight component and the low molecular weight component means there are two corresponding molecular weight distributions in the resulting GPC curve of the ethylene-based resin. As used herein, "unimodal," when used in reference to the molecular weight distribution of a component polymer of the ethylene-based resin means the molecular weight distribution in a GPC curve of the component polymer does not substantially exhibit multiple molecular weight distributions.

The term "procatalyst" or "precursor", are used interchangeably herein, and denote a compound comprising a ligand, a transition metal, and optionally, an electron donor. The procatalyst may further undergo halogenation by contacting with one or more halogenating agents. A procatalyst can be converted into a catalyst upon activation. Such catalysts are commonly referred to as Ziegler-Natta catalysts. Suitable Zeigler-Natta catalysts are known in the art and include, for example, the catalysts taught in U.S. Pat. Nos. 4,302,565; 4,482,687; 4,508,842; 4,990,479; 5,122,494; 5,290,745; and, 6,187,866 B1, the disclosures of which are hereby incorporated by reference. The collection of catalyst components, such as procatalyst(s), cocatalyst(s), is referred to as a catalyst system.

The transition metal compound of the procatalyst composition can comprise compounds of different kinds. The most usual are titanium compounds—organic or inorganic—having an oxidation degree of 3 or 4. Other transition metals such as, vanadium, zirconium, hafnium, chromium, molybdenum, cobalt, nickel, tungsten and many rare earth metals are also suitable for use in Ziegler-Natta catalysts. The transition metal compound is usually a halide or oxyhalide, an organic metal halide or purely a metal organic compound. In the last-mentioned compounds, there are only organic ligands attached to the transition metal.

The procatalyst can have the formula $Mg_d\ Me(OR)_e\ X_f\ (ED)_g$ wherein R is an aliphatic or aromatic hydrocarbon radical having 1 to 14 carbon atoms or COR' wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is >1 to 1.5(d). Me is a transition metal selected from the group of titanium, zirconium, hafnium and vanadium. Some specific examples of suitable titanium compounds are: $TiCl_3$, $TiCl_4$, $Ti(OC_2H_5)_2Br_2$, $Ti(OC_6H_5)Cl_3$, $Ti(OCOCH_3)Cl_3$, $Ti(acetylacetonate)_2Cl_2$, $TiCl_3$ (acetylacetonate), and $TiBr_4$. $TiCl_3$ and $TiCl_4$ are preferred titanium compounds.

The magnesium compounds include magnesium halides such as $MgCl_2$, $MgBr_2$, and $MgI_2$. Anhydrous $MgCl_2$ is a preferred compound. Other compounds useful in the invention are $Mg(OR)_2$, $Mg(OCO_2Et)$ and MgRCl where R is defined above. About 0.5 to about 56, and preferably about 1 to about 20, moles of the magnesium compounds are used per mole of transition metal compound. Mixtures of these compounds may also be used.

The procatalyst compound can be recovered as a solid using techniques known in the art, such as precipitation of the procatalyst or by spray drying, with or without fillers. Spray drying is a particularly preferred method for recovery of the procatalyst compound. Spray drying is taught in U.S. Pat. No. 5,290,745 and is hereby incorporated by reference. A further procatalyst comprising magnesium halide or alkoxide, a transition metal halide, alkoxide or mixed ligand transition metal compound, an electron donor and optionally, a filler can be prepared by spray drying a solution of said compounds from an electron donor solvent.

The electron donor is typically an organic Lewis base, liquid at temperatures in the range of about 0° C. to about 200° C., in which the magnesium and transition metal compounds are soluble. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl mono-ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. Mono-ether is defined herein as a compound that contains only one ether functional group in the molecule. For ethylene homo and co-polymerization, the most preferred electron donor is tetrahydrofuran. Other examples of suitable electron donors are methyl formate, ethyl acetate, butyl acetate, ethyl ether, dioxane, di-n-propyl ether, dibutyl ether, ethanol, 1-butanol, ethyl formate, methyl acetate, ethyl anisate, ethylene carbonate, tetrahydropyran, and ethyl propionate.

While an excess of electron donor may be used initially to provide the reaction product of transition metal compound and electron donor, the reaction product finally contains about 1 to about 20 moles of electron donor per mole of transition metal compound and preferably about 1 to about 10 moles of electron donor per mole of transition metal compound. The ligands comprise halogen, alkoxide, aryloxide, acetylacetonate and amide anions.

Partial activation of the procatalyst can be carried out prior to the introduction of the procatalyst into the reactor. The partially activated catalyst alone can function as a polymerization catalyst but at greatly reduced and commercially unsuitable catalyst productivity. Complete activation by additional cocatalyst is required to achieve full activity. The complete activation occurs in the polymerization reactor via addition of cocatalyst.

The catalyst procatalyst can be used as dry powder or slurry in an inert liquid. The inert liquid is typically a mineral oil. The slurry prepared from the catalyst and the inert liquid has a viscosity measured at 1 sec$^{-1}$ of at least 500 cp at 20° C. Examples of suitable mineral oils are the Kaydol and Hydrobrite mineral oils from Crompton.

In one embodiment in a polymerization process, the procatalyst undergo in-line reduction using reducing agent(s). The procatalyst is introduced into a slurry feed tank; the slurry then passes via a pump to a first reaction zone immediately downstream of a reagent injection port where the slurry is mixed with the first reagent, as described below. Optionally, the mixture then passes to a second reaction zone immediately downstream of a second reagent injection port where it is mixed with the second reagent (as described below) in a second reaction zone. While only two reagent injection and reaction zones are described above, additional reagent injection zones and reaction zones may be included, depending on the number of steps required to fully activate and modify the catalyst to allow control of the specified fractions of the polymer molecular weight distribution. Means to control the temperature of the catalyst procatalyst feed tank and the individual mixing and reaction zones are provided.

Depending on the activator compound used, some reaction time may be required for the reaction of the activator compound with the catalyst procatalyst. This is conveniently done using a residence time zone, which can consist either of an additional length of slurry feed pipe or an essentially plug flow holding vessel. A residence time zone can be used for both activator compounds, for only one or for neither, depending entirely on the rate of reaction between activator compound and catalyst procatalyst.

Exemplary in-line reducing agents are aluminum alkyls and aluminum alkyl chlorides of the formula $AlR_xCl_y$, where $X+Y=3$ and y is 0 to 2 and R is a C1 to C14 alkyl or aryl radical. Such in-line reducing agents include those listed in the following table:

| Reducing Agents | Reducing Agents |
| --- | --- |
| Diethylaluminum chloride | Triethylaluminum |
| Ethylaluminum dichloride | Trimethylaluminum |
| di-isobutyaluminum chloride | Triisobutylaluminum |
| dimethylaluminum chloride | Tri-n-hexylaluminum |
| Methylaluminum sesquichloride | Tri-n-octylaluminum |
| Ethylaluminum sesquichloride | Dimethylaluminum chloride |

The entire mixture is then introduced into the reactor where the activation is completed by the cocatalyst. Additional reactors may be sequenced with the first reactor, however, catalyst is typically only injected into the first of these linked, sequenced reactors with active catalyst transferred from a first reactor into subsequent reactors as part of the polymer thus produced.

The cocatalysts, which are reducing agents, conventionally used are comprised of aluminum compounds, but compounds of lithium, sodium and potassium, alkaline earth metals as well as compounds of other earth metals than aluminum are possible. The compounds are usually hydrides, organometal or halide compounds. Conventionally, the cocatalysts are selected from the group comprising Al-trialkyls, Al-alkyl halides, Al-alkyl alkoxides and Al-alkyl alkoxy halides. In particular, Al-alkyls and Al-alkyl chlorides are used. These compounds are exemplified by trimethylaluminum, triethylaluminum, tri-isobutylaluminum, tri-n-hexylaluminum, dimethylaluminum chloride, diethylaluminum chloride, ethylaluminum dichloride and diisobutylaluminum chloride, isobutylaluminum dichloride and the like. Butyllithium and dibutylmagnesium are examples of useful compounds of other metals.

The ethylene-based resins described herein may be used in injection molded applications to make caps or closures having weld lines formed therein. Referring to FIG. 1, depicted is an exemplary injection molded cap or closure (100) having a cap portion (105) and a tamper evident band portion (110). A weld line (115) is formed in the tamper evident band portion (110) and is located between every two consecutive bridges (120). During processing, the weld lines (115) are formed where different streams of polymer melt pass (125, showing the polymer flow path) through the multiple bridge channels in a mold and then meet to form the tamper evident bad. The places where the polymer melt fronts meet during molding are weld lines (115). In some embodiments herein, a method of manufacturing injection molded caps or closures having a weld line is described, the method comprising (i) providing an ethylene-based resin comprising a high molecular weight component, wherein the high molecular weight component comprises an ethylene/alpha-olefin copolymer having a density of from 0.915 g/cc to 0.940 g/cc and a high load melt index (I21.6) of from 3.0 g/10 min to 12.0 g/10 min; and a low molecular weight component; wherein the ethylene-based resin comprises 50 wt. % to 60 wt. % of the high molecular weight component; and wherein the ethylene-based resin has: a density of from 0.945 g/cc to 0.958 g/cc; a melt index (I2.16) of from 1.0 g/10 min to 3.0 g/10 min; an molecular weight distribution (Mw/Mn) of from 5.0 to 8.0, where Mw is the weight average molecular weight and Mn is the number average molecular weight; and a cross-over relaxation time of less than 80 ms; and (ii) injection molding the ethylene-based resin to form an injection molded cap or closure having a weld line.

Test Methods

Unless otherwise stated, the following test methods are used. All test methods are current as of the filing date of this disclosure.

Density

Samples that are measured for density are prepared according to ASTM D4703. Measurements are made within one hour of sample pressing using ASTM D792, Method B.

Melt Index

Melt index, also referred to as $I_2$ or $I_{2.16}$, for ethylene-based polymers is determined according to ASTM D1238 at 190° C., 2.16 kg. High load melt index or Flow Index, also referred to as $I_{21}$ or $I_{21.6}$, for ethylene-based polymers is determined according to ASTM D1238 at 190° C., 21.6 kg.

Gel Permeation Chromatography (GPC) Molecular Weight Determination

Polymer molecular weight is characterized by high temperature gel permeation chromatography (GPC). The chromatographic system consists of a Polymer Laboratories "GPC-220 high temperature" chromatograph, equipped with a Precision Detectors (Amherst, Mass.) 2-angle laser light scattering detector, Model 2040, and a 4-capillary differential viscometer detector, Model 210R, from Viscotek (Houston, Tex.). The 15° angle of the light scattering detector is used for calculation purposes.

Data collection is performed using PolymerChar (Valencia, Spain) GPC One Instrument Control. The system is equipped with an on-line solvent degas device from Polymer Laboratories. The carousel compartment and column compartment are operated at 150° C. The columns are four Polymer Laboratories "Mixed A" 20 micron columns, and one 20 um guard column. The polymer solutions are prepared in 1,2,4 trichlorobenzene (TCB). The samples are prepared at a concentration of 0.1 grams of polymer in 50 ml of solvent. The chromatographic solvent and the sample preparation solvent contain 200 ppm of butylated hydroxytoluene (BHT). Both solvent sources are nitrogen sparged. Polyethylene samples are stirred gently at 160° C. for 4 hours. The injection volume is 200 µl, and the flow rate is 1.0 ml/minute.

Calibration of the GPC column set is performed with 21 narrow molecular weight distribution polystyrene standards. The molecular weights of the standards range from 580 to 8,400,000, and are arranged in 6 "cocktail" mixtures, with at least a decade of separation between individual molecular weights. The polystyrene standard peak molecular weights are converted to polyethylene molecular weights using the following equation (as described in Williams and Ward, J. Polym. Sci., Polym. Lett., 6, 621 (1968)):

$$M_{polyethylene} = A \times (M_{polystyrene})^B,$$

where M is the molecular weight, A has a value of 0.4316, and B is equal to 1.0.

A fifth order polynomial is used to fit the respective polyethylene-equivalent calibration points. The total plate count of the GPC column set is performed with Eicosane (prepared at 0.04 g in 50 milliliters of TCB, and dissolved for 20 minutes with gentle agitation.) The plate count and symmetry are measured on a 200 microliter injection according to the following equations:

$$PlateCount = 5.54 * \left(\frac{RV \text{ at Peak Maximum}}{\text{Peak Width at } \frac{1}{2} \text{ height}}\right)^2$$

where RV is the retention volume in milliliters, and the peak width is in milliliters.

$$Symmetry = \frac{\left(\text{Rear Peak Width at } \frac{1}{10} \text{ height}\right) - (RV \text{ at Peak Maximum})}{(RV \text{ at Peak Maximum}) - \left(\text{Front Peak Width at } \frac{1}{10} \text{ height}\right)},$$

where RV is the retention volume in milliliters, and the peak width is in milliliters.

The calculations of Mn, Mw, and Mz are based on GPC results using the RI detector are determined from the following equations:

$$\overline{Mn} = \frac{\Sigma^i RI_i}{\Sigma^i (RI_i / Mcalibration_i)},$$

$$\overline{Mw} = \frac{\Sigma^i (RI_i * Mcal_i)}{\Sigma^i (RI_i)},$$

$$\overline{Mz} = \frac{\Sigma^i (RI_i * Mcal_i)^2}{\Sigma^i (RI_i * Mcal_i)}$$

In order to monitor the deviations over time, which may contain an elution component (caused by chromatographic changes) and a flow rate component (caused by pump changes), a late eluting narrow peak is generally used as a "marker peak". A flow rate marker is therefore established based on decane flow marker dissolved in the eluting sample. This flow rate marker is used to linearly correct the flow rate for all samples by alignment of the decane peaks. Any changes in the time of the marker peak are then assumed to be related to a linear shift in both flow rate and chromatographic slope. The preferred column set is of 20 micron particle size and "mixed" porosity to adequately separate the highest molecular weight fractions appropriate to the claims. The plate count for the chromatographic system (based on eicosane as discussed previously) should be greater than 20,000, and symmetry should be between 1.00 and 1.12.

Cross-Over Relaxation Time

Cross-over relaxation times can be extracted from data collected through dynamic mechanical spectroscopy (DMS) frequency sweep of resins, measured at 190° C. Cross-over relaxation times are calculated using the lowest frequency intersection of the storage modulus (G') and loss modulus (G") frequency sweeps. The frequency at the intersection of G' and G" is converted to a time by taking the inverse of the frequency.

Dynamic Mechanical Spectroscopy (DMS)

Rheological properties (complex viscosity, loss (G") and storage (G') modulus, phase angle) are measured via a frequency sweep from 0.01 to 500 rad/s at 10% strain, which is well within the linear viscoelastic region of the materials. The measurements are performed at 190° C. in an N2 environment to avoid oxidative degradation. All qualification measurements are run with an ARES-G2 rheometer from TA Instruments equipped with 25-mm-diameter parallel plates. The gap between the plates is set at about 1.8 mm. Temperature is controlled with a convection oven. The samples are prepared by compression-molding the polymer pellets into 2-mm thick plaques and a 25-mm diameter puck is punched out. After placing the puck onto the bottom plate of the rheometer, the sample is allowed to reach thermal equilibrium. The gap is then closed and excess sample is removed with a trimming tool.

Creep Zero Shear Viscosity Measurement Method

Zero-shear viscosities are obtained via creep tests, which are conducted on an AR-G2 stress controlled rheometer (TA Instruments; New Castle, Del.), using "25-mm-diameter" parallel plates, at 190° C. The rheometer oven is set to test temperature for at least 30 minutes, prior to zeroing the fixtures. At the testing temperature, a compression molded sample disk is inserted between the plates, and allowed to come to equilibrium for five minutes. The upper plate is then lowered down to 50 mm (instrument setting) above the desired testing gap (1.5 mm). Any superfluous material is trimmed off, and the upper plate is lowered to the desired gap. Measurements are done under nitrogen purging, at a flow rate of 5 L/min. The default creep time is set for two hours. Each sample is compression-molded into a "2 mm thick×25 mm diameter" circular plaque, at 177° C., for five minutes, under 10 MPa pressure, in air. The sample is then taken out of the press and placed on a counter top to cool.

A constant low shear stress of 20 Pa is applied for all of the samples, to ensure that the steady state shear rate is low enough to be in the Newtonian region. The resulting steady state shear rates are in the range from $10^{-3}$ to $10^{-4}$ s$^{-1}$ for the samples in this study. Steady state is determined by taking a linear regression for all the data, in the last 10% time window of the plot of "log (J(t)) vs. log(t)," where J(t) is creep compliance and "t" is creep time. If the slope of the linear regression is greater than 0.97, steady state is considered to be reached, then the creep test is stopped. In all cases in this study, the slope meets the criterion within one hour. The steady state shear rate is determined from the slope of the linear regression of all of the data points, in the last 10% time window of the plot of "ε vs. t," where ε is strain. The zero-shear viscosity is determined from the ratio of the applied stress to the steady state shear rate.

In order to determine if the sample is degraded during the creep test, a small amplitude oscillatory shear test is conducted before, and after, the creep test, on the same specimen from 0.1 to 100 rad/s. The complex viscosity values of the two tests are compared. If the difference of the viscosity values, at 0.1 rad/s, is greater than 5%, the sample is considered to have degraded during the creep test, and the result is discarded.

Zero-Shear Viscosity Ratio (ZSVR) is defined as the ratio of the zero-shear viscosity (ZSV) of the branched polyethylene material to the ZSV of a linear polyethylene material (see ANTEC proceeding below) at the equivalent weight average molecular weight (Mw(conv gpc)), according to the following Equation 5:

$$ZSVR = \frac{\eta_{0B}}{\eta_{0L}} = \frac{\eta_{0B}}{2.29^{-15} M_{w(conv\,gpc)}^{3.65}}. \quad \text{(Eqn. 5)}$$

The ZSV value is obtained from creep test, at 190° C., via the method described above. The Mw(conv gpc) value is determined by the conventional GPC method (Equation 3), as discussed above. The correlation between ZSV of linear polyethylene and its Mw(conv gpc) is established based on a series of linear polyethylene reference materials. A description for the ZSV-Mw relationship can be found in the ANTEC proceeding: Karjala et al., *Detection of Low Levels of Long-chain Branching in Polyolefins*, Annual Technical Conference—Society of Plastics Engineers (2008), 66th 887-891.

Tamper Evident Extension-to-Break

Figure 2:
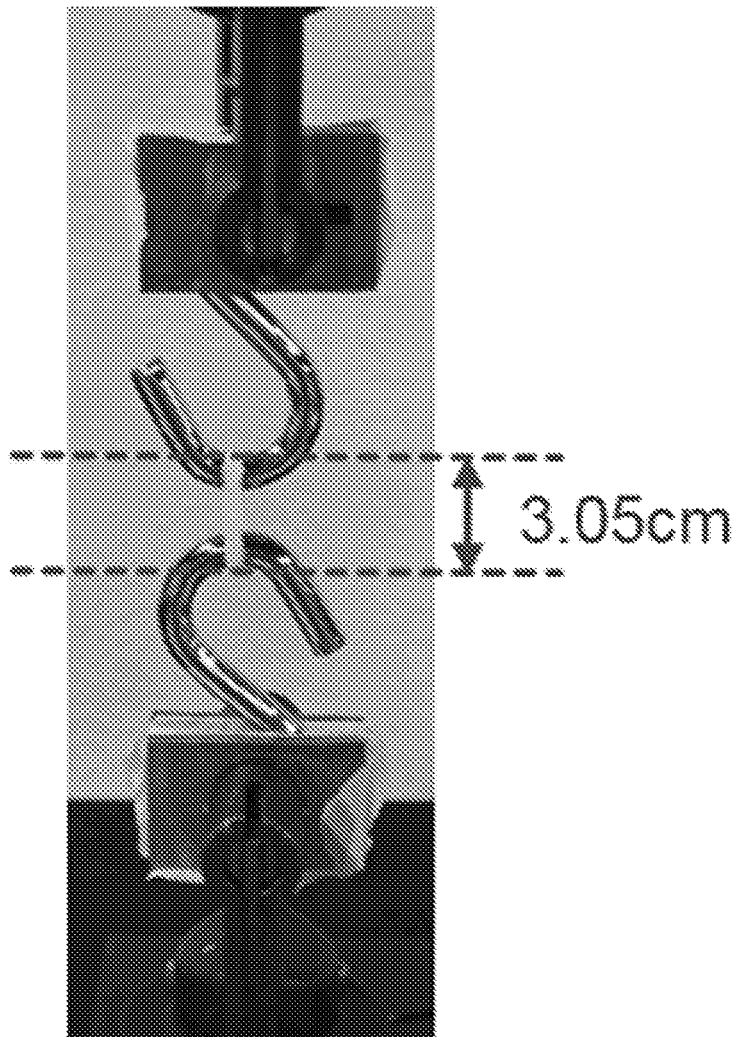
FIG. 2 pictorially depicts the setup for measuring extension-to-break of tamper evident bands.

Closures molded according to conditions listed in Table 3 are conditioned for 48 hours at room temperature. Tamper evident bands are detached from the closure for testing. Tamper bands have a circumference of 29.5 mm, a height of 4.3 mm, and an average thickness of 1.9 mm at the weld lines. Away from the weld lines, the tamper band has an average thickness of 1.1 mm. Failure always occurs at the weld lines. Tamper evident bands are secured to a tensile tester through hooks with circular cross-section diameter of 0.76 cm at the point of contact. The bands are initially extended to a starting length of 3.05 cm when measured from the highest contact point between band and the top hook to the lowest contact point between the band and the bottom hook. The top hook and the bottom hook hold the tamper evident band. An initial setup for extension-to-break measurement is depicted in FIG. 2 below. Tamper evident bands are pulled until failure where the tamper evident band is broken in the middle and is no longer a ring, and the extension to failure is determined from the load-extension curve reported by Instron tensile tester software.

Closure Environmental Stress Crack Resistance (ESCR)

A temperature controlled chamber is set to 40° C. The 28 mm PCO 1881 closures are applied to injection molded 1881 PET bottle finishes at 18 in-lbs of torque using an automated Steinfurth TMS 5000 closure application instrument. The bottle finish part of the assembly is outfitted with tubing in the base that is then attached to an air supply at the top of the controlled chamber and held upside down. The outside of the closure only is fully immersed in a 10% Tergitol NP-9 or equivalent solution. The pressure inside the preform/closure assembly is then set at 4.1 bars and monitored until a crack develops on the closure. The time it takes for a crack to develop is recorded, as well as the relative position of the crack on the closure, either top panel or corner typically.

Resin Environmental Stress Crack Resistance (ESCR)

The resin environmental stress crack resistance (ESCR) (F50) is measured according to ASTM D-1693-01, condition B at 50° C. using 10% Tergitol NP-9 or equivalent. The ESCR value is reported as F50, the calculated 50 percent failure time from the probability graph.

2% Secant Flexural Modulus

2% Secant flexural modulus is measured according to ASTM D790 using Type I ASTM bars, with a testing speed of 12.7 mm/min (0.5 inches/min).

EXAMPLES

The embodiments described herein may be further illustrated by the following non-limiting examples.

Inventive Resins & Comparative Resin A

Inventive resins 1-6 are prepared as follows: each resin is an ethylene-based resin produced using a catalyst system comprising a procatalyst, UCAT™ J (commercially available from Univation Technologies, LLC, Houston, TX), and a cocatalyst, triethylaluminum (TEAL), in a gas phase polymerization process. The UCAT™ J catalyst is partially activated by contact at room temperature with an appropriate amount of a 50 percent mineral oil solution of tri-n-hexyl aluminum (TNHA). The catalyst slurry is added to a mixing vessel. While stirring, a 50 percent mineral oil solution of tri-n-hexyl aluminum (TNHA) is added at ratio of 0.17 moles of TNHA to mole of residual THF in the catalyst and stirred for at least 1 hour prior to use. Ethylene (C2) and optionally, 1-hexene (C6) are polymerized in two fluidized bed reactors. Each polymerization is continuously conducted, after equilibrium is reached, under the respective conditions, as shown below in Tables 1A & 1B. Polymerization is initiated in the first reactor by continuously feeding the catalyst and cocatalyst (trialkyl aluminum, specifically triethyl aluminum or TEAL fed in an isopentane solution containing 2.5 weight % TEAL) into a fluidized bed of polyethylene granules, together with ethylene, hydrogen, and 1-hexene. The resulting polymer, mixed with active catalyst, is withdrawn from the first reactor, and transferred to the second reactor, using second reactor gas as a transfer medium. The second reactor also contains a fluidized bed of polyethylene granules. Ethylene, hydrogen and, optionally, 1-hexene are introduced into the second reactor, where the gases come into contact with the polymer and catalyst from the first reactor. Inert gases, nitrogen and isopentane, make up the remaining pressure, in both the first and second reactors. In the second reactor, the cocatalyst (TEAL) is again introduced. The final product blend is continuously removed. Table 1A lists polymerization conditions for inventive resins 1-4, and Table 1B lists the polymerization conditions for inventive resins 5 and 6, as well as the polymerization conditions for comparative resin A.

Comparative Example Resins

Comparative resins B-E are prepared in the same manner as the inventive examples under the process conditions shown in Table 2. Comparative resin F is DMDD-1210 resin, available from The Dow Chemical Company (Midland, MI) having a density of 0.952 g/cc and a melt index, I2, of 10.0 g/10 min, both of which may be measured according to the test methods described herein.

Closure Fabrication

The inventive and comparative resins are used to form 28 mm PCO 1881 finish 2.15 g one piece carbonated soft drink (CSD) closures. The closures are molded using a Sumitomo Demag SE130V injection molding press. The mold temperature ranged from 13 to 14° C. Table 3 provides additional conditions used to fabricate closures.

TABLE 1A

Process Conditions for Inventive Resins 1-4

| | Unit | Inv. 1 | Inv. 2 | Inv. 3 | Inv. 4 |
|---|---|---|---|---|---|
| Co-Monomer Type | n/a | Hexene | Hexene | Hexene | Hexene |
| Catalyst | n/a | UCAT ™-J | UCAT ™-J | UCAT ™-J | UCAT ™-J |
| Co-Catalyst | n/a | 2.5% TEAL | 2.5% TEAL | 2.5% TEAL | 2.5% TEAL |
| 1st Reactor Type | n/a | Gas Phase | Gas Phase | Gas Phase | Gas Phase |
| 2nd Reactor Type | n/a | Gas Phase | Gas Phase | Gas Phase | Gas Phase |
| 1st Reactor Temperature | deg C. | 85 | 85 | 85 | 85 |
| 2nd Reactor Temperature | deg C. | 105 | 105 | 105 | 105 |
| 1st Reactor Pressure | psi | 348 | 348 | 348 | 348 |
| 2nd Reactor Pressure | psi | 393 | 392 | 392 | 392 |
| 1st Reactor C2 Partial Pressure | psi | 41.5 | 41.2 | 41.6 | 40.1 |
| 2nd Reactor C2 Partial Pressure | psi | 112.5 | 84.5 | 93.1 | 83.9 |
| 1st Reactor H2/C2 Molar Ratio | n/a | 0.106 | 0.141 | 0.125 | 0.146 |
| 2nd Reactor H2/C2 Molar Ratio | n/a | 1.00 | 1.00 | 1.00 | 1.00 |
| 1st Reactor C6/C2 Molar Ratio | n/a | 0.059 | 0.044 | 0.030 | 0.033 |
| 2nd Reactor C6/C2 Molar Ratio | n/a | 0.004 | 0.004 | 0.012 | 0.012 |
| Catalyst Feed Rate (1st reactor only) | cc/hr | 5.6 | 4.1 | 4.3 | 5.1 |
| 1st Reactor Isopentane | mol % | 11.9 | 11.9 | 11.9 | 11.9 |
| 2nd Reactor Isopentane | mol % | 5.0 | 5.0 | 5.0 | 5.0 |
| Split (wt % 1$^{st}$ Reactor) | | 51.0% | 55.3% | 54.2% | 50.7% |
| 1st Reactor Cocatalyst Feed Rate | cc/hr | 271 | 293 | 298 | 293 |
| 2nd Reactor Cocatalyst Feed Rate | cc/hr | 139 | 139 | 140 | 153 |
| 1st Reactor Production Rate | lb/hr | 36.8 | 38.0 | 39.2 | 34.0 |
| 2nd Reactor Production Rate | lb/hr | 35.5 | 30.7 | 32.9 | 32.9 |
| 1st Reactor Bed Weight | lbs | 86.1 | 86.5 | 86.7 | 89.5 |
| 2nd Reactor Bed Weight | lbs | 146.1 | 141.8 | 143.6 | 144.1 |
| 1st Reactor FBD | lb/ft3 | 11.4 | 12.2 | 12.6 | 11.4 |
| 2nd Reactor FBD | lb/ft3 | 16.0 | 15.5 | 16.2 | 15.8 |
| 1st Reactor Residence Time | hr | 2.3 | 2.3 | 2.2 | 2.6 |
| 2nd Reactor Residence Time | hr | 2.0 | 2.1 | 2.0 | 2.2 |
| Flow Index (I21.6) (1st Component) | dg/min | 4.66 | 6.62 | 4.55 | 6.54 |
| Density (1st Component) | g/cc | 0.9331 | 0.9365 | 0.9384 | 0.9383 |

TABLE 1B

Process Conditions for Inventive Resins 5 & 6, and Comparative Resin A

| | Unit | Inv. 5 | Inv. 6 | Comp. A |
|---|---|---|---|---|
| Co-Monomer Type | n/a | Hexene | Hexene | Hexene |
| Catalyst | n/a | UCAT ™-J | UCAT ™-J | UCAT ™-J |
| Co-Catalyst | n/a | 2.5% TEAL | 2.5% TEAL | 2.5% TEAL |
| 1st Reactor Type | n/a | Gas Phase | Gas Phase | Gas Phase |
| 2nd Reactor Type | n/a | Gas Phase | Gas Phase | Gas Phase |
| 1st Reactor Temperature | deg C. | 85 | 85 | 85 |
| 2nd Reactor Temperature | deg C. | 105 | 105 | 110 |
| 1st Reactor Pressure | psi | 347 | 347 | 347 |
| 2nd Reactor Pressure | psi | 392 | 392 | 393 |
| 1st Reactor C2 Partial Pressure | psi | 39.7 | 42.2 | 41.5 |
| 2nd Reactor C2 Partial Pressure | psi | 82.7 | 91.6 | 93.5 |
| 1st Reactor H2/C2 Molar Ratio | n/a | 0.136 | 0.159 | 0.103 |
| 2nd Reactor H2/C2 Molar Ratio | n/a | 1.00 | 1.00 | 1.80 |
| 1st Reactor C6/C2 Molar Ratio | n/a | 0.033 | 0.050 | 0.072 |
| 2nd Reactor C6/C2 Molar Ratio | n/a | 0.008 | 0.008 | 0.002 |
| Catalyst Feed Rate (1st reactor only) | cc/hr | 5.1 | 5.4 | 5.0 |
| 1st Reactor Isopentane | mol % | 11.9 | 11.9 | 11.8 |
| 2nd Reactor Isopentane | mol % | 5.0 | 4.9 | 5.0 |
| Split (wt % 1st Reactor) | | 50.5% | 52.6% | 54.0% |
| 1st Reactor Cocatalyst Feed Rate | cc/hr | 313 | 294 | 297 |
| 2nd Reactor Cocatalyst Feed Rate | cc/hr | 144 | 139 | 142 |
| 1st Reactor Production Rate | lb/hr | 34.8 | 36.4 | 35.2 |
| 2nd Reactor Production Rate | lb/hr | 34.1 | 32.8 | 30.1 |
| 1st Reactor Bed Weight | lbs | 86.4 | 87.7 | 87.1 |
| 2nd Reactor Bed Weight | lbs | 142.1 | 145.8 | 156.6 |
| 1st Reactor FBD | lb/ft3 | 11.2 | 10.8 | 10.6 |
| 2nd Reactor FBD | lb/ft3 | 15.7 | 15.5 | 16.1 |
| 1st Reactor Residence Time | hr | 2.5 | 2.4 | 2.5 |
| 2nd Reactor Residence Time | hr | 2.1 | 2.1 | 2.4 |
| Flow Index (I21.6) (1st Component) | dg/min | 5.74 | 10.10 | 5.50 |
| Density (1st Component) | g/cc | 0.9382 | 0.9367 | 0.9315 |

TABLE 2

Process Conditions for Comparative Resins B-E

| | Unit | Comp. B | Comp. C | Comp. D | Comp. E |
|---|---|---|---|---|---|
| Co-Monomer Type | n/a | Hexene | Hexene | Hexene | Hexene |
| Catalyst | n/a | UCAT ™-J | UCAT ™-J | UCAT ™-J | UCAT ™-J |
| Co-Catalyst | n/a | 2.5% TEAL | 2.5% TEAL | 2.5% TEAL | 2.5% TEAL |
| 1st Reactor Type | n/a | Gas Phase | Gas Phase | Gas Phase | Gas Phase |
| 2nd Reactor Type | n/a | Gas Phase | Gas Phase | Gas Phase | Gas Phase |
| 1st Reactor Temperature | deg C. | 85 | 85 | 85 | 85 |
| 2nd Reactor Temperature | deg C. | 110 | 110 | 110 | 110 |
| 1st Reactor Pressure | psi | 347 | 347 | 347 | 348 |
| 2nd Reactor Pressure | psi | 398 | 398 | 398 | 397 |
| 1st Reactor C2 Partial Pressure | psi | 31 | 31 | 31 | 40 |
| 2nd Reactor C2 Partial Pressure | psi | 107 | 106 | 108 | 89 |
| 1st Reactor H2/C2 Molar Ratio | n/a | 0.070 | 0.070 | 0.053 | 0.130 |
| 2nd Reactor H2/C2 Molar Ratio | n/a | 1.80 | 1.80 | 1.80 | 1.80 |
| 1st Reactor C6/C2 Molar Ratio | n/a | 0.0752 | 0.0752 | 0.1033 | 0.0245 |
| 2nd Reactor C6/C2 Molar Ratio | n/a | 0.0004 | 0.0134 | 0.0012 | 0.0142 |

TABLE 2-continued

Process Conditions for Comparative Resins B-E

| | Unit | Comp. B | Comp. C | Comp. D | Comp. E |
|---|---|---|---|---|---|
| Catalyst Feed Rate (1st reactor only) | cc/hr | 8.10 | 8.10 | 7.90 | 7.90 |
| 1st Reactor Isopentane | mol % | 11.87 | 11.95 | 11.95 | 11.73 |
| 2nd Reactor Isopentane | mol % | 5.00 | 5.05 | 5.06 | 5.02 |
| Split (Wt % First Reactor) | | 45.7% | 45.4% | 45.2% | 52.1% |
| 1st Reactor Cocatalyst Feed Rate | cc/hr | 286 | 321 | 318 | 319 |
| 2nd Reactor Cocatalyst Feed Rate | cc/hr | 164 | 166 | 166 | 173 |
| 1st Reactor Production Rate | lb/hr | 35.4 | 36.2 | 26.4 | 34.6 |
| 2nd Reactor Production Rate | lb/hr | 42.0 | 43.6 | 32.0 | 31.8 |
| 1st Reactor Bed Weight | lbs | 84 | 83 | 82 | 83 |
| 2nd Reactor Bed Weight | lbs | 171 | 151 | 165 | 144 |
| 1st Reactor FBD | lb/ft3 | 12.4 | 12.1 | 12.6 | 12.8 |
| 2nd Reactor FBD | lb/ft3 | 17.2 | 14.0 | 16.7 | 14.5 |
| 1st Reactor Residence Time | hr | 2.4 | 2.3 | 3.1 | 2.4 |
| 2nd Reactor Residence Time | hr | 2.2 | 1.9 | 2.8 | 2.2 |
| Flow Index (I21.6) (1st Component) | dg/min | 2.22 | 2.24 | 2.29 | 4.23 |
| Density (1st Component) | g/cc | 0.9278 | 0.9281 | 0.9234 | 0.9396 |

TABLE 3

Process Conditions for Closure Fabrication

| Molding Conditions | Inv. 1-5 & Comp. A-E | Inv. 6 | Comp. F |
|---|---|---|---|
| Feed Throat | 45 C. | 45 C. | 45 C. |
| Barrel (All Zones) | 220 C. | 220 C. | 205 C. |
| Hold Pressure | 8500 psi | 8000 psi | 8500 psi |
| Hold Time | 1 sec | 1 sec | 1 sec |
| Transfer Velocity | 13 in/sec | 13 in/sec | 7 in/sec |
| Transfer Position | 7 mm | 8 mm | 7 mm |
| Cool Time | 0.6 sec | 0.3 sec | 0.4 sec |
| Cycle Time | 3.58 sec | 3.30 sec | 3.43 sec |
| Fill Time | 0.104 sec | 0.106 sec | 0.163 |
| Ejection Position | 47.00 mm | 56.97 mm | 47.00 mm |
| Min Cushion | 4.16 mm | 4.61 mm | 3.70 mm |
| Dose Time | 0.74 sec | 0.78 sec | 1.02 sec |

Results

The results are shown in Tables 4-5.

TABLE 4A

Ethylene-Based Resin Component Properties

| | HMW Density (g/cc) | HMW Flow Index, $I_{21.6}$ (g/10 min) | HMW (estimated MWD*) | Amount of HMW Component (%) | LMW Calculated Density (g/cc) |
|---|---|---|---|---|---|
| Inv. 1 | 0.933 | 4.7 | ~4 | 51 | 0.9768 |
| Inv. 2 | 0.937 | 6.6 | ~4 | 55 | 0.9719 |
| Inv. 3 | 0.938 | 4.5 | ~4 | 54 | 0.9731 |
| Inv. 4 | 0.938 | 6.5 | ~4 | 51 | 0.9686 |
| Inv. 5 | 0.938 | 5.7 | ~4 | 51 | 0.9707 |
| Inv. 6 | 0.937 | 10.1 | ~4 | 53 | 0.9674 |
| Comp. A | 0.932 | 5.5 | ~4 | 54 | 0.9795 |
| Comp. B | 0.928 | 2.2 | ~4 | 46 | 0.9792 |
| Comp. C | 0.928 | 2.2 | ~4 | 45 | 0.9725 |
| Comp. D | 0.923 | 2.3 | ~4 | 45 | 0.9770 |
| Comp. E | 0.940 | 4.2 | ~4 | 52 | 0.9745 |
| Comp. F | N/A | N/A | N/A | N/A | N/A |

*estimated based on making HMW component in a single reactor.

TABLE 4B

Ethylene-Based Resin Properties

| | Overall Density (g/cc) | Overall $I_{2.16}$ (g/10 min) | Overall $I_{21.6}$ (g/10 min) | Eta0 | ZSVR | Cross-over Relaxation Time (ms) |
|---|---|---|---|---|---|---|
| Inv. 1 | 0.954 | 1.6 | 82.9 | — | — | 55 |
| Inv. 2 | 0.952 | 1.5 | 64.4 | 9,514 | 1.18 | 49 |
| Inv. 3 | 0.954 | 1.4 | 69.2 | — | — | 63 |
| Inv. 4 | 0.953 | 1.6 | 75.2 | — | — | 48 |
| Inv. 5 | 0.954 | 1.5 | 67.0 | — | — | 53 |
| Inv. 6 | 0.951 | 2.4 | 102.4 | — | — | 31 |
| Comp. A | 0.953 | 1.5 | 91.5 | — | — | 97 |
| Comp. B | 0.955 | 1.4 | 134.4 | — | — | 185 |
| Comp. C | 0.952 | 1.7 | 160.0 | — | — | 175 |
| Comp. D | 0.952 | 1.4 | 136.5 | — | — | 209 |
| Comp. E | 0.956 | 1.4 | 87.0 | — | — | 112 |
| Comp. F | 0.952 | 10 | N/A | — | — | <13 |

TABLE 4C

Ethylene-Based Resin Properties

| | Mn (g/mol) | Mw (g/mol) | Mz (g/mol) | Mw/Mn | Mz/Mw |
|---|---|---|---|---|---|
| Inv. 1 | 16,631 | 122,134 | 616,020 | 7.3 | 5.0 |
| Inv. 2 | 17,883 | 120,659 | 567,792 | 6.8 | 4.7 |
| Inv. 3 | 16,823 | 124,204 | 621,771 | 7.4 | 5.0 |
| Inv. 4 | 17,147 | 119,026 | 597,908 | 6.9 | 5.0 |
| Inv. 5 | 17,446 | 122,745 | 597,213 | 7.0 | 4.9 |
| Inv. 6 | 16,593 | 107,385 | 520,432 | 6.5 | 4.9 |
| Comp. A | 12,821 | 122,870 | 637,522 | 9.6 | 5.2 |
| Comp. B | 9,542 | 124,811 | 774,215 | 13.1 | 6.2 |
| Comp. C | 9,185 | 122,662 | 767,676 | 13.4 | 6.3 |
| Comp. D | 9,402 | 126,594 | 794,274 | 13.5 | 6.3 |
| Comp. E | 10,041 | 124,684 | 678,819 | 12.4 | 5.4 |
| Comp. F | 17,351 | 72,108 | 289,888 | 4.2 | 4.0 |

TABLE 5

| | Resin and Closure Properties | | | |
|---|---|---|---|---|
| Product | ASTM ESCR (hours) | Closure ESCR (hours) | Flexural 2% (ksi) | Avg. Extension-to-Break (inch) |
| Inv. 1 | 149 | 59 | 153.7 | 0.97 |
| Inv. 2 | 76 | 52 | 150.2 | 1.04 |
| Inv. 3 | 31 | 44 | 154.8 | 0.94 |
| Inv. 4 | 47 | 31 | 152.8 | 0.90 |
| Inv. 5 | 39 | 35 | 152.3 | 1.14 |
| Inv. 6 | 70 | 31 | 147.2 | 1.05 |
| Comp. A | 412 | 101 | 147.5 | 0.79 |
| Comp. B | 1000+ | 153 | 150.0 | 0.53 |
| Comp. C | 294 | 77 | 144.8 | 0.60 |
| Comp. D | 1000+ | 400+ | 139.4 | 0.58 |
| Comp. E | 45 | 45 | 146.3 | 0.67 |
| Comp. F | 12 | N/A | 154.8 | 1.41 |

Figure 3:
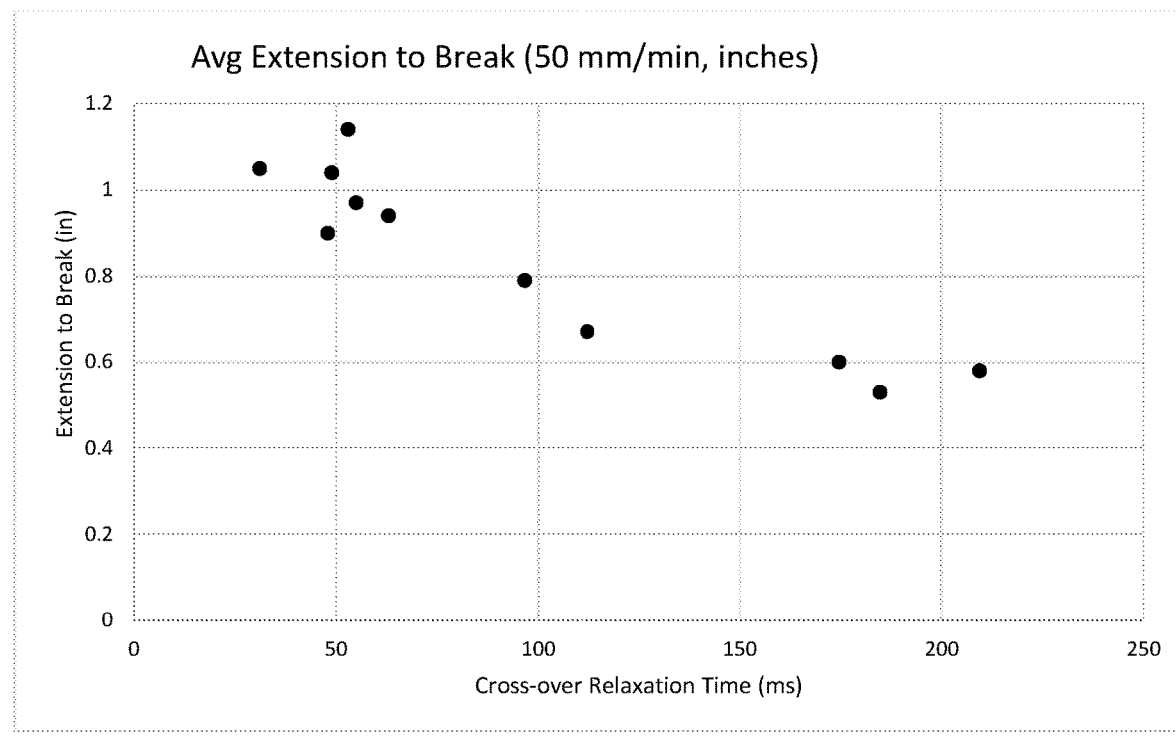
FIG. 3 graphically depicts the cross-over relaxation time versus the average extension-to-break.

Referring to FIG. 3, the average extension-to-break length is plotted as a function of cross-over relaxation time. As shown in the figure, the inventive tamper evident bands have a high average extension-to-break length compared to the comparative tamper evident bands. Without being bound by theory, it is believed that weld lines can introduce weak points in an injection molded article. Applicants have surprisingly found that the polyethylene formulations described herein balance the physical properties (e.g., toughness, crack-resistance, stiffness, and processability) and organoleptic properties for injection molding of a cap or closure, while also produce excellent weld lines (as shown by the improved extension-to-break length) by controlling, for example, the polymer polydispersity, polymer split, and/or polymer cross-over relaxation time. Further, as shown by the closure ESCR and the flexural modulus, the tamper evident bands still offer suitable physical properties.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. An injection molded cap or closure having a weld line, wherein the injection molded cap or closure is formed from an ethylene-based resin comprising:
 a high molecular weight component, wherein the high molecular weight component comprises an ethylene/alpha-olefin copolymer having a density of from 0.915 g/cc to 0.940 g/cc and a high load melt index (I21.6) of from 3.0 g/10 min to 12.0 g/10 min; and
 a low molecular weight component;
 wherein the ethylene-based resin comprises 50 wt. % to 60 wt. % of the high molecular weight component; and
 wherein the ethylene-based resin has:
 a density of from 0.945 g/cc to 0.958 g/cc;
 a melt index (I2.16) of from 1.0 g/10 min to 3.0 g/10 min;
 a molecular weight distribution (Mw/Mn) of from 5.0 to 8.0, where Mw is the weight average molecular weight and Mn is the number average molecular weight; and
 a cross-over relaxation time of less than 80 ms.

2. The cap or closure of claim 1, wherein the high molecular weight has a molecular weight distribution (Mw/Mn) of from 3.5 to 5.5.

3. The cap or closure of claim 1, wherein the high molecular weight component has a density of from 0.920 g/cc to 0.939 g/cc.

4. The cap or closure of claim 1, wherein the low molecular weight component has a calculated density of at least 0.950 g/cc as calculated according to the following equation:

$$\frac{1}{\text{Density }(PE)} = \frac{\text{Weight Fraction }(A)}{\text{Density }(A)} + \frac{\text{Weight Fraction }(B)}{\text{Density }(B)}$$

where "PE" is the ethylene-based resin, "A" is the high molecular weight component and "B" is the low molecular weight component.

5. The cap or closure of claim 1, wherein the ethylene-based resin has a melt index (I2.16) ranging from 1.2 g/10 min to 2.7 g/10 min.

6. The cap or closure of claim 1, wherein the ethylene-based resin comprises 50 wt. % to 57 wt. % of the high molecular weight component.

7. The cap or closure of claim 1, wherein the ethylene-based resin has a high load melt index (I21.6) ranging from 50 g/10 min to 110 g/10 min.

8. The cap or closure of claim 1, wherein the ethylene-based resin has an Mz of greater than or equal to 450,000 g/mol.

9. The cap or closure of claim 1, wherein the ethylene-based resin has an Mw/Mn of 5.0 to 7.5.

10. The cap or closure of claim 1, wherein the ethylene-based resin has an Mz/Mw of 4.1 to 5.2.

11. The cap or closure of claim 1, wherein the ethylene-based resin has a zero shear viscosity ratio of less than or equal to 1.25.

12. The cap or closure of claim 1, wherein the ethylene-based resin has an environmental stress crack resistance (ESCR) F50, as measured according to ASTM D-1693-01, condition B at 50° C. using 10% Tergitol NP-9 or equivalent, of 30 to 200 hours.

* * * * *